United States Patent [19]
Boatner et al.

[11] Patent Number: 4,847,219
[45] Date of Patent: Jul. 11, 1989

[54] NOVEL LEAD-IRON PHOSPHATE GLASS

[75] Inventors: Lynn A. Boatner; Brian C. Sales, both of Oak Ridge, Tenn.

[73] Assignee: Martin Marietta Energy Systems, Inc., Delaware

[21] Appl. No.: 27,455

[22] Filed: Mar. 18, 1987

Related U.S. Application Data

[63] Continuation-in-part of Ser. No. 870,296, May 23, 1986, which is a continuation of Ser. No. 599,111, Apr. 11, 1984, abandoned.

[51] Int. Cl.$^4$ .......................... C03C 8/10; C03C 8/08; C03C 6/00; C03C 3/16
[52] U.S. Cl. ........................................ 501/27; 501/22; 501/24; 501/45
[58] Field of Search ................. 501/22, 24, 45, 27; 252/628, 629

[56] References Cited

U.S. PATENT DOCUMENTS 3,120,493  2/1964  Clark et al. .................... 252/629
3,365,578  1/1968  Grover et al. ................ 252/629 X

OTHER PUBLICATIONS

Chem. Ab. 80:73979, (1974); Thomas, K. T., (Int. At. Energy Agency, Vienna, Austria), Report 1971, IA-EA-R-874-F.
Chem. Ab. 88(18):125328; Shchavelar et al., U.S.S.R. 587, 111, Jan. 5, 1978.
Sales et al., *J. Non-Cryst. Solids*, 71(1-3), pp. 103-12, 1985.
Sales et al., *Science*, 226(4670), pp. 45-8, 1984.

*Primary Examiner*—Brooks H. Hunt
*Assistant Examiner*—Virginia B. Caress
*Attorney, Agent, or Firm*—Herman L. Holsopple; Bruce M. Winchell

[57] ABSTRACT

The invention described and claimed in the specification relates to the discovery that effective addition of $Fe_2O_3$ to a lead phosphate glass results in a glass having enhanced chemical durability and physical stability, and consists essentially of the glass resulting from melting a mixture consisting essentially of, in weight percent, 40–66 percent PbO, 30–55 percent $P_2O_5$ and an effective concentration up to 12 percent $Fe_2O_3$.

4 Claims, No Drawings

NOVEL LEAD-IRON PHOSPHATE GLASS

BACKGROUND OF THE INVENTION

The U.S. Government has rights in this invention pursuant to COntract No. DE-W-7405-ENG-26 between the U.S. Department of Energy and Union Carbide Corporation and pursuant to Contract DE-AC05-840R21400 between Martin Marietta Energy Systems, Inc., and the Department of Energy.

This application is a continuation-in-part of and is directed to the non-elected invention disclosed in Ser. No. 870,296 filed May 23, 1986, which, in turn, is a continuation of Ser. No. 599,111 filed Apr. 11, 1984, now abandoned the disclosures of which are hereby incorporated by reference.

The present invention relates to a novel lead-iron phosphate glass composition having particular utility as a containment medium for radioactive as well as non-radioactive materials. The use of the novel lead-iron phosphate glass for containment of radioactive waste is treated in detail in our copending U.S. application Ser. No. 870,296. The present invention emphasizes the composition and its utilities not only as a containment medium, but as a material of construction for a number of applications.

It is the primary object of this invention to provide a physically and chemically stable lead-iron phosphate glass composition for use as a containment medium or as a structural material. A specific object of this invention is to provide a stable glass composition for containment of hazardous chemicals such as those designated by the Environmental Protection Agency. These and other objects may be realized from an improved lead phosphate glass containing sufficient soluble levels of iron oxide as $Fe_2O_3$ in the lead phosphate to produce a glass of enhanced chemical durability in water and suppress the tendency of lead phosphate glasses to crystallize.

We have found that effective additions, up to 12 weight percent based on the weight of the starting lead phosphate glass, lead to quite remarkable and unexpected properties in the resultant glass. While lead phosphate glasses are susceptible to aqueous corrosion and tend to vitrify (crystallize) at temperatures as low as 300° C., the additions of effective concentrations of $Fe_2O_3$ as a third component leads to improved corrosion resistance, in some cases by a factor of as much as 10,000, relative to the iron-free lead phosphate glass. Moreover, the resultant iron-doped glass does not exhibit evidence of devitrification even after being heated in air at 575° C. for 100 hours.

The action of $Fe_2O_3$ is unique. We investigated a wide variety of oxides including MgO, $Al_2O_3$, CaO, $Sc_2O_3$, $TiO_2$, $VO_2$, $CrO_3$, $MnO_2$, CoO, NiO, $Cu_2O$, ZnO, $Ga_2O_3$, $Ti_2O_3$, $Y_2O_3$, $In_2O_3$ and several rare earth oxides. None of these oxides were as effective in producing a glass which had the desirable combination of physical properties which $Fe_2O_3$ provided in terms of imparting chemical and physical stability to the lead phosphate glass. Physical and spectroscopic studies of the effect of iron oxide indicate that the structure of pure lead metaphosphate glass $Pb(PO_3)_2$, which consist of long chains of phosphate tetrahedra is modified by location of iron as ferric iron ($Fe^{+++}$) in a manner which strengthens bonding between phosphate chains.

TABLE

| Compound | Weight % |
|---|---|
| PbO | 40–66 |
| $P_2O_5$ | 30–55 |
| $Fe_2O_3$ | up to 12 |

Pure lead phosphate glass can be prepared by fusing PbO (lead oxide) with $P_2O_5$ (phosphorous pentoxide) at a temperature in the range of 800° to 900° C. The composition of the resulting glass frit can be continuously varied by adjusting the ratio of lead oxide to phosphorous oxide. If the weight percent of lead oxide exceeds about 66 percent, a crystalline form of lead phosphate is formed and the additions of ferric oxide thereto will not lead to the improved glass of this invention. Hence, an upper 66 weight percent PbO represents a critical upper limit. We have also found that 45 weight percent lead oxide represents a practical lower limit in the sense that the viscosity of the molten glass increases as the PbO content is reduced below 45 percent, although concentrations of as much as 40 percent PbO still remain useful to obtain the enhanced physical properties resulting from the inclusion of $Fe_2O_3$ to the lead phosphate glass. As the melt viscosity increases the glass becomes hard to pour and higher glass melting temperatures are required.

The lead-iron phosphate glass compositions of this invention can be prepared by mixing 30 to about 55 weight percent phosphorous oxide, 40 to 66 weight percent lead oxide, and up to 12 weight percent iron oxide, as $Fe_2O_3$, heating the resultant mixture over an oxidizing atmosphere such as air at a temperature in the range 800° C. to 1050° C. for a period of time sufficient to solubilize the $Fe_2O_3$. For use as a containment material for solid hazardous waste materials, up to 20 percent by weight of these materials based on the weight of the glass, may be mixed with the glass in order to obtain a final composition which will effectively immobilize the contained waste material.

A preferred source of the phosphorous oxide used to prepare the lead-iron phosphate glass is ammonium dihydrogen phosphate, i.e., $(NH)_4H_2PO_4$, because it readily decomposes to $P_2O_5$ and is preferred over $P_2O_5$—a material that is hygroscopic and more difficult to handle.

After the melt has solidified, the resultant frit can in one useful embodiment be ground to a powder to use as a starting material for formulating various articles of utility for which the glass of this invention is amenable.

The lead-iron phosphate glass compositions of this invention can serve as a solvent or matrix phase for containment of chemical waste materials which are stable up to the melting point of the glass such as heavy metals, metal oxides, carbides, or nitrides. Most of the oxides we have tested have been found to be readily soluble in the lead-iron phosphate glass medium at a temperature in the range of 800° to 1000° C.

Testing of the lead iron phosphate glass of this invention has indicated a high level of chemical durability. Moreover, we have found that the glasses are not subject to devitrification over extended periods of time even when they are maintained at high temperatures and over cycles of temperature.

A particularly useful application of the glasses of this invention relates to its value as a protective coating as opposed to its value in forming monoliths for gross containment of waste materials. Thus, for example, applications where the enhanced chemical durability of the glass together and its lead content serve to make it particularly suitable for applications where articles require protection from corrosive atmospheres and also require hardening against radiation damage. For such applications effective bonding of the lead-iron phosphate glass to a given substrate is simply effected by dipping the substrate into a melt of the glass for a period of time ranging from 1 to 2 minutes at a melt temperature in the range 800° to 900° C. to form a continuous adherent glazed coating on the substrate. Adherent, durable glazes are achieved with glass compositions consisting essentially of, in weight percent, 52 to 58 percent PbO, 32 to 38 percent $P_2O_5$, and 8-12 percent $Fe_2O_3$. Substrates which are particularly suitable for applying a glazed surface thereon include ceramic components, electronic systems such as semiconductor circuits, integrated circuits, and memories and other glass compositions including glass filaments. In some cases, achievement of a continuous adherent coating of the lead-iron phosphate glass may require deposition of an intermediate material on the substrate surface. Materials useful for this purpose include epoxy resins, other glasses such as soft glasses which serve as a solder material.

The lead-iron phosphate glasses of this invention are particularly useful in applications which require high thermal insulation as well as radiation shielding. For such applications and because of the satisfactory low melting temperatures of the glass, it can be readily made into such forms as fiberglass or as a component of a composite fabric, shape or part. In particular because of the favorably low melt viscosity formed by the glasses within the scope of this invention, they are readily amenable for casting into artistic or utilitarian shapes such as glass tiles, bricks, laminated glass, and even into shapes which have intricate internal and external surfaces.

The lead-iron phosphate glasses of this invention may also be used as a variable density optical filter and as a glass for absorbing radiant optical energy, converting it to heat to serve as a passive solar absorber. The degree of opacity may be varied by altering the total iron content of the composition, and the oxidation state of the iron. The oxidation state may be controlled by the melting atmosphere, e.g., utilizing a mildly reducing atmosphere such as argon or an oxidizing atmosphere such as air or oxygen. High concentrations of iron in the plus-two oxidation state provide the greatest degree of opacity.

Having described our invention in such clear and concise terms is to enable one skilled in the art to practice the invention, applicants now claim what they regard as their invention in the following claims.

We claim:

1. A chemically and physically durable lead-iron phosphate glass composite produced from melting and cooling a mixture consisting essentially of, in weight percent, 40-66 percent lead oxide, PbO, 30-55 percent phosphorous oxide, $P_2O_5$, and up to 12 percent iron oxide, as $Fe_2O_3$, at a temperature in the range of 800°-1050° C. in an oxidizing atmosphere for a period of time sufficient to solubilize the iron oxide.

2. The glass of claim 1 wherein the preferred source of the phosphorous oxide is ammonium dihydrogen phosphate.

3. The glass of claim 1 wherein the oxidizing atmosphere is air.

4. The glass of claim 1 wherein the period of time sufficient to solubilize the iron oxide provides a corrosion and radioactive-resistant glass of optimum viscosity and having convenient handling properties.

* * * * *